# UNITED STATES PATENT OFFICE.

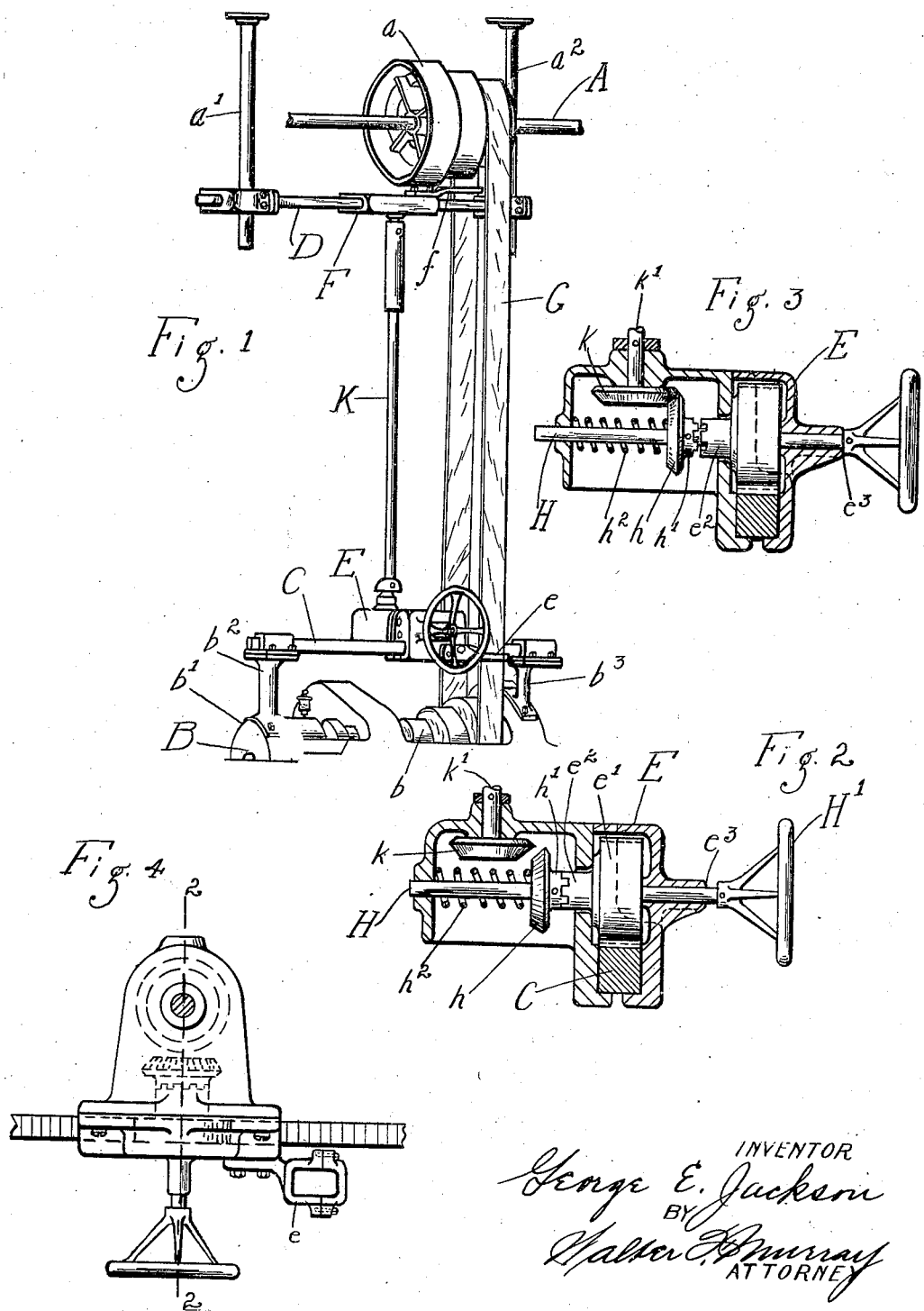

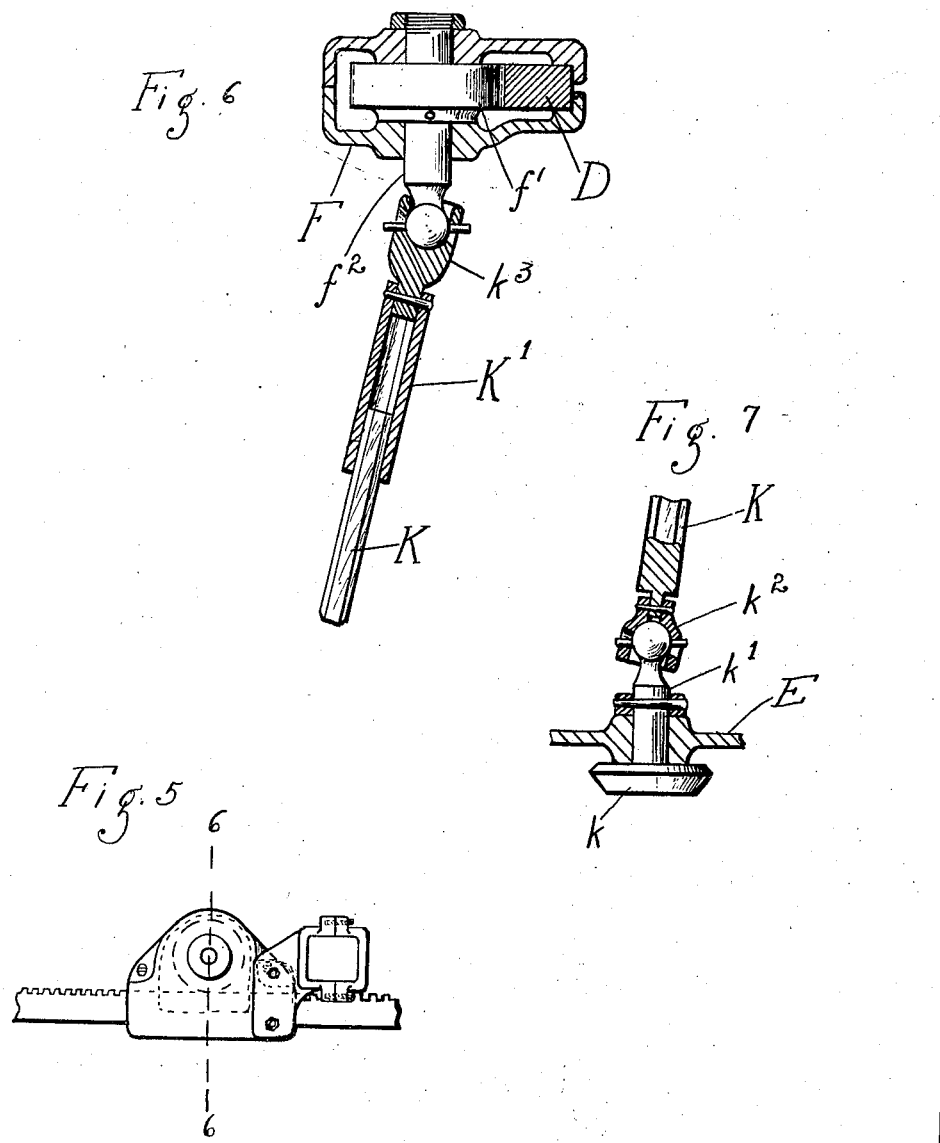

GEORGE E. JACKSON, OF CINCINNATI, OHIO, ASSIGNOR TO THE GREAVES-KLUSMAN TOOL COMPANY, OF CINCINNATI, OHIO, A CORPORATION OF OHIO.

BELT-SHIFTER.

1,335,736.

Specification of Letters Patent.

Patented Apr. 6, 1920.

Application filed October 15, 1919. Serial No. 330,863.

*To all whom it may concern:*

Be it known that I, GEORGE E. JACKSON, a citizen of the United States of America, and a resident of Cincinnati, in the county of Hamilton and State of Ohio, have invented a new and useful Improvement in Belt-Shifters, of which the following is a specification.

This invention relates to a means for shifting a belt upon the cone of a driving and of a driven shaft.

The object of my invention is a belt-shifter by means of which a belt may be shifted to the position in which it gets a proper grip upon the cones of the driving and the driven shafts.

Another object is a belt-shifter the operation of which is accomplished by simple movements.

Another object of the invention is a belt-shifter of simplified construction.

These and other objects are attained by the means described in the specification and illustrated in the accompanying drawing, in which:—

Figure 1, is a perspective view of a belt-shifter embodying my invention.

Fig. 2, is a sectional view taken upon line 2—2 of Fig. 4.

Fig. 3, is a view similar to Fig. 2, but showing the other position of the parts.

Fig. 4, is a detail plan view of the lower rack, a housing and of the hand wheel.

Fig. 5, is an inverted plan view of the upper rack and housing.

Fig. 6, is a sectional view of the upper rack and housing taken upon line 5—5 of Fig. 4, but showing the socket joint, the sleeve and connector rod.

Fig. 7, is a detail view of the lower end of the connector rod and of the lower pinion.

The belt-shifter embodying my invention is illustrated in Fig. 1 as applied to a counter shaft A, and a drive shaft B upon which are cone-pulleys $a$ and $b$, respectively. Upon head stock $b'$ I place brackets $b^2$, $b^3$, in which I mount a rack C. A rack D is mounted from brackets $a'$, $a^2$, which extend from the ceiling or other support, adjacent to the counter shaft A. Upon rack C a housing E is reciprocally mounted and upon rack D a housing F is reciprocally mounted. Housing E carries a loop $e$ which is adapted to engage belt G adjacent to the pulley $b$. Housing F has a loop $f$ which is adapted to engage the belt G, adjacent to the pulley $a$. Within housings E and F are mounted pinions $e'$, $f'$ which engage the teeth of the racks C and D respectively. Actuator shaft H is journaled in the housing E and passes loosely through pinion $e'$.

Secured upon actuator shaft H is a bevel gear $h$ which has one member $h'$ of a clutch, the other member $e^2$ of which is secured to the pinion $e'$. A spring $h^2$ normally holds the clutch members $h'$, $e^2$ in mesh with each other.

Mounted in the housing E, adjacent to the bevel gear $h$, is a bevel gear $k$, the upper end of whose stud shaft $k'$ is connected by a ball and joint $k^2$ to the lower end of a connector rod K, whose upper end fits into a sleeve $k'$ which is connected by a ball and joint $k^3$ with the stud shaft $f^2$ of the pinion $f'$. In cross section the bore of the sleeve K' and the connector rod K are made angular so that they will rotate together.

Actuator shaft H is capable of a transverse reciprocation in the housing E, so as to permit the bevel gears $h$ and $k$ to be brought into and out of mesh with each other. Hand wheel H' is secured upon the outer end of shaft H in position such that when the bevel gears are in mesh, the hub of the hand wheel abuts against the shoulder $e^3$ of housing E.

In operation, belt G may be shifted to any one of the cones $b$ by turning the hand wheel H', while the parts are in the position illustrated in Fig. 2. Then the operator may shift the belt to the corresponding cone $a$, by pushing inward upon the hand wheel so as to bring the bevel gears into mesh with each other, and by rotating the hand wheel in a direction opposite to that which he rotated it to shift the belt on to the lower cones.

The belt may be shifted upon any of the cones until it gets the proper grip thereon. Moreover, one end of the belt may be shifted the full length of the cones in one of the pulleys before the other end of the belt is moved.

Having thus described my invention, what I claim is:—

1. A belt-shifter comprising a pair of racks and pinions, an actuator shaft adapted to actuate either of the pinions, a manually operated selective mechanism for putting either one of the pinions under the domination of the actuator shaft and means for coupling a belt to the pinions.

2. In a belt-shifter the combination of a pair of racks, means for mounting one of the pair adjacent to a counter-shaft and the other adjacent to a driven shaft, a pair of pinions, means for mounting a pinion reciprocally upon each rack, means for coupling the pinions to a belt, an actuator shaft, a connector rod at one end in mesh with one of the pinions and having its opposite end adjacent to the actuator shaft, and a manually operated mechanism for coupling the actuator shaft either with the other pinion or the connector rod.

3. In a belt-shifter the combination of a rack, brackets adapted to mount it upon a head stock, a second rack, brackets adapted to mount the second rack adjacent to a counter shaft, a housing mounted reciprocally upon the first rack, an actuator shaft mounted rotatably and reciprocally in the housing, a pinion mounted loosely upon the actuator shaft and engaging the rack, a pinion secured upon the actuator shaft, clutch members adapted to connect the pinion upon the actuator shaft with the aforesaid pinion, a second pinion mounted in the housing and adapted to be engaged by the pinion upon the actuator shaft, a connector rod secured to the last mentioned pinion, a housing mounted upon the second rack, a pinion in the housing and a coupling connecting the pinion and the connector rod.

In testimony whereof, I have hereunto subscribed my name this 13th day of October, 1919.

GEORGE E. JACKSON.